US00RE42672E

(19) United States
(12) Reissued Patent
Stutzman et al.

(10) Patent Number: US RE42,672 E
(45) Date of Reissued Patent: Sep. 6, 2011

(54) WIDEBAND COMPACT PLANAR INVERTED-F ANTENNA

(75) Inventors: Warren L. Stutzman, Blacksburg, VA (US); Minh-Chau Huynh, Foster City, CA (US)

(73) Assignee: Virginia Tech Intellectual Properties, Inc., Blacksburg, VA (US)

(21) Appl. No.: 11/516,804

(22) PCT Filed: Apr. 27, 2001

(86) PCT No.: PCT/US01/13603

§ 371 (c)(1),
(2), (4) Date: May 9, 2003

(87) PCT Pub. No.: WO01/82412

PCT Pub. Date: Nov. 1, 2001

Related U.S. Patent Documents

Reissue of:
(64) Patent No.: 6,795,028
Issued: Sep. 21, 2004
Appl. No.: 10/258,534
Filed: May 9, 2003

U.S. Applications:
(60) Provisional application No. 60/200,009, filed on Apr. 27, 2000.

(51) Int. Cl.
*H01Q 1/24* (2006.01)

(52) U.S. Cl. ..... 343/702; 343/700 MS

(58) Field of Classification Search ..... 343/700 MS, 343/702, 846, 829, 848
See application file for complete search history.

(56) References Cited

U.S. PATENT DOCUMENTS

| | | | | |
|---|---|---|---|---|
| 4,641,366 | A | 2/1987 | Yokoyama et al. | |
| 5,148,181 | A | 9/1992 | Yokoyama et al. | |
| 5,231,407 | A * | 7/1993 | McGirr et al. | 343/700 MS |
| 5,644,319 | A | 7/1997 | Chen et al. | |
| 5,764,190 | A | 6/1998 | Murch et al. | |
| 5,781,158 | A | 7/1998 | Ko et al. | |
| 6,342,860 | B1 | 1/2002 | Haussler et al. | |
| 6,483,463 | B2 * | 11/2002 | Kadambi et al. | 343/700 MS |
| 6,573,869 | B2 * | 6/2003 | Moore | 343/702 |
| 6,593,888 | B2 | 7/2003 | Fu et al. | |
| 6,683,575 | B2 | 1/2004 | Sekine et al. | |
| 6,734,825 | B1 * | 5/2004 | Guo et al. | 343/700 MS |
| 7,046,196 | B1 * | 5/2006 | Langley et al. | 343/700 MS |

* cited by examiner

*Primary Examiner* — Tho G Phan
(74) *Attorney, Agent, or Firm* — Connolly Bove Lodge & Hutz LLP

(57) ABSTRACT

An improved low profile antenna of the [PIPA] *PIFA* style is formed from a single piece of useful conductive material and includes a first plate spaced apart from an elongated ground plate. The first and ground plates are interconnected by a shorting plate having a width less than that of either the first *or* ground plate. A feed plate is interposed between the two plates and is either completely covered by the first plate or slightly exposed. Such antennas have extremely large bandwidth of up to about 50%.

26 Claims, 4 Drawing Sheets

WIDEBAND COMPACT PLANAR INVERTED-F ANTENNA

Matter enclosed in heavy brackets [ ] appears in the original patent but forms no part of this reissue specification; matter printed in italics indicates the additions made by reissue.

This application is a 371 of PCT/US01/13603 filed Apr. 27, 2001 which claims benefit of Ser. No. 60/200,009 filed Apr. 27, 2000.

BACKGROUND OF THE INVENTION

The present invention relates generally to planar inverted-F antennas, and more particularly to such an antenna with improved performance characteristics that is particularly suitable for use in wireless telephones.

The wireless communication industry has expanded rapidly and many different frequency bands have been implemented. A need exists for wireless devices that operate in multi-frequency bands. Dual band antennas have been used to meet this need, however, many dual band antennas use a dual feed which introduces difficulties into the feed system. Dual band antennas permit wireless handsets to operate in different networks that have different frequencies. There are more than three frequency bands used in the world for wireless communications. It is possible, but expensive to place multiple antennas on handsets and it also increases the complexity of the handset.

The use of wireless (cellular) telephones is very widespread. Not only has the size of wireless telephones decreased in the past few years, but the functional capabilities of such telephones have increased as well. Some of these wireless telephones are smaller than the palm of a user. In order to operate effectively and to deliver the needed functionability required of today's wireless technology, a useful and reliable antenna must be utilized. Planar inverted-F antennas, also known by the acronym "PIFA" have been popular and used in wireless devices such as handheld telephones because a PIFA has a low profile geometry and it does not extends out of the telephone as do most monopole stubby antennas used in current wireless handheld devices.

Notwithstanding the size advantages, many low profile antennas in use today have a narrow bandwidth. This parameter of bandwidth is limited in most applications by the need to match the impedance of the antenna to the system with which it is used. Conventional PIFAs, such as that described in U.S. Pat. No. 5,764,190, issued June 1998, have large resonant frequencies of 1.58 to about 1.78 GHz but with a bandwidth of about only 5% of the resonant frequency. This is usually referenced by a 2:1 VSWR into a 50 ohm load. This structure has its own disadvantages, one of which is that it utilizes the casing of the telephone handset as a ground plane and the other of which is that even with its low profile and capacitive feed, its achieved bandwidth is only about 5% at a VSWR (Voltage Standing Wave Ratio) of 2 or less.

A number of telephones are described in the literature in broadening bandwidth. These techniques include the use of a parasitic structure with a resonant frequency near that of the during antenna structure. Another is the use of a stacked microstrip patch antenna described in the articles "Broadband Air-Filled, Stacked U-Slot Shorted Patch Antenna" in Electronic Letters No. 35, Pages 515-517 (1999) or in "Design Probe-fed Stacked Patches" in IEEE Transactions on Antennas and Propagation, Vol. 47, No. 12, Pages 1780-1784, December 1999.

There are new frequencies of wireless communication proposed for a high end of frequencies in the 34 Hz range. This is known as the UMTS band and will increase the frequency bandwidth to about 23% to encompass the most used frequency bands.

A need therefore exists for a low profile antenna that has a greater bandwidth than 5% to utilize most, if not all of current and proposed wireless frequency bands, but which still maintains a desirable small size. The present invention is directed to a low profile antenna that overcomes the aforementioned disadvantages.

SUMMARY OF THE INVENTION

It is therefore a general object of the present invention to provide a low profile, PIFA-style antenna in use with wireless handsets that has improved performance characteristics, such as improved bandwidth.

Another object of the present invention is to provide a PIFA that utilizes its own ground plane, rather then that of a wireless handset casing and which utilizes a capacitive feed with a small ground plane.

Yet another object of the present invention is to provide an improved PIFA for use with wireless handsets, the PIFA including a first conductive plate that serves as a ground plate, a second conductive plate overlying the first plate and having a length much less than the first plate, a short circuit plate connecting these two plates together and a feed plate interposed between the first and ground plate, the feed plate being connected to the transmitter/receiver of the wireless handset.

Still another object of the present invention is to provide a low profile, planar inverted-F antenna for use in wireless applications that includes an integrated ground plane and has an increased bandwidth.

The present invention achieves these and other objects by way of novel and unique structure. In accordance with one principal aspect of the present invention, a PIFA is provided that includes a conductive radiating element in the form of a plate, an elongated ground plate spaced apart from and underneath the radiating element, short circuit plate interconnecting the radiating element to the ground plate and a feed plate interposed. In this manner, the ground plate is formed as part of the entire antenna structure, thereby eliminating the need to use a different conducting plane, such as a metal housing of the handset to perform the grounding function and reduce the overall size of the handset.

In another important aspect of the present invention and as exemplified by another embodiment thereof, the feed plate and radiating element are dimensioned so that the feed plate is completely shielded by the radiating-element so as to prevent the feed plate from radiating, so as to eliminate undesirable variations in antenna radiating pattern and control of the resonant frequency. As a result, the ground plate becomes the main radiating element, and by dimensioning the first and feed plates, the bandwidth of the antenna can be significantly increased to about 50%.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which.

DETAILED DESCRIPTION OF THE PREFERRED EMBODIMENTS

Figure 1:
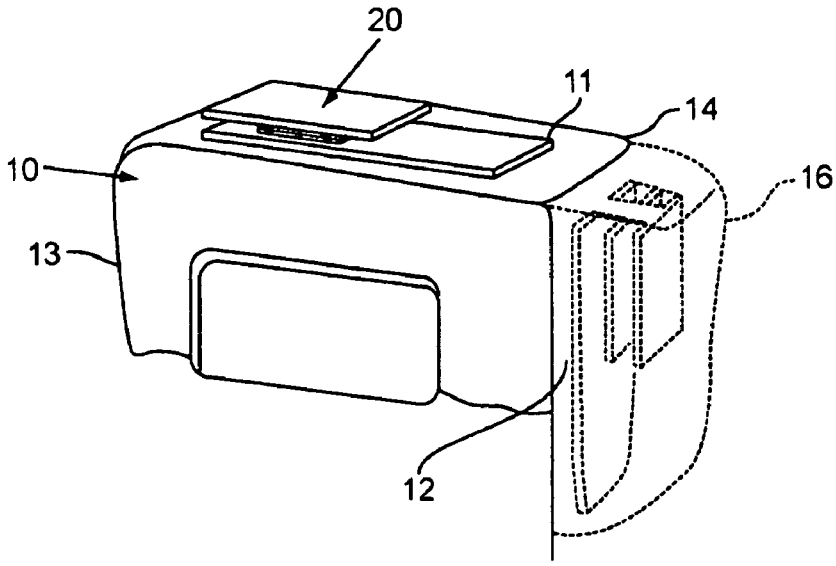
FIG. 1 is a perspective view of one embodiment of an antenna constructed in accordance with the principles of the present invention mounted in two different orientations upon a wireless handset.

FIG. 1 illustrates a wireless handset, such as a cellular telephone or portable radio 10 to which an antenna 20 constructed in accordance with the principles of the present invention is attached. The antenna 20 is shown disposed along the top surface 11 of the handset 10, but may be attached at other suitable locations on the handset 10, such as either of the side surfaces 12, 13 or rear surface 14. A side mounting of the antenna 20 is shown in FIG. 1 in dashed line. Typically, the antenna 20 will be enclosed within a protective housing 16, or within the handset housing, but electrically isolated from the handset circuitry except for the connector.

Figure 2:
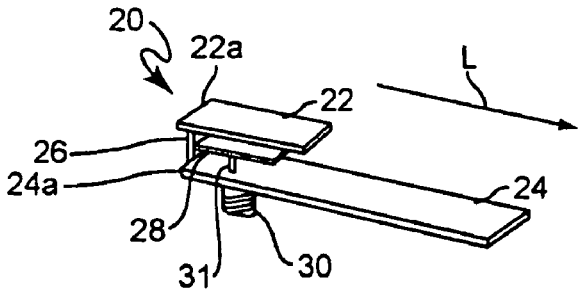
FIG. 2 is a perspective view of the antenna of FIG. 1 detached from the handset.

FIG. 2 illustrates, in perspective one embodiment of a low profile antenna 20 constructed in accordance of the principles of the present invention. As shown best in FIGS. 2 and 3, the antenna 20 is of a "PIFA" style, that is a planar, inverted-F antenna. In this regard, the antenna 20 shown has a first conductive plate 22 and a second conductive plate, or ground plate 24 that serves as a ground plane for the antenna 20. The two plates 22, 24 are interconnected together to form a one-piece or integral antenna structure by way of a small shorting plate 26. This shorting plate 26 extends vertically between the two plates 22 and 24 and as shown best in FIG. 4 at approximately the centers of both the first and second conductive plates 22, 24 at the left edges, 22a, 24a thereof. The shorting plate 26 extends in a plane generally transverse to the planes in which the first and ground plates 22, 24 lie. Preferably, these two plates 22, 24 are arranged parallel to each other.

A conductive, non-contacting feed is provided for the antenna 20 by terminating the inner conductor 31 of an RF connector 30 to a fourth conductive plate 28, that acts as a feed plate for the system. The inner conductor 31 passes through the ground plate 24 and into contact with the feed plate [2B] *28*, while the outer conductor 32, i.e., the casing, of the RF connector is terminated to the ground plate. This feed plate 28 preferably has the same width W (FIG. 4) as the first and ground plates 22, 24. As mentioned above, the first ground plate, upper plate and shorting plates 22, 24, 26 are all formed together as a single unit and may be easily stapled and formed from a conductive blank. In this manner, the ground plane of the antenna is made part of the entire antenna structure and therefore does not require any other conducting element such as a metal casing, to act as the ground plane in order for the antenna to function properly. As such, the structure of the antennas of the present invention differ from other PIFA-style antennas in the prior art, such as U.S. Pat. No. 5,764,190 issued June 1998.

Additionally, it is desired in this embodiment that first plate 22 entirely cover the feed plate 28, that is, it shields (using the non-electrical definition of "shield") or shrouds the feed plate 28 in the horizontal plane in which the first plate 22 extends. These two relationships constitute to the improved operation. The literature indicates that the use of a PIFA-style antenna with a large, but distinct ground plane, as evidenced by the above-mentioned U.S. Pat. No. 5,764,190, has a limited band width that ranges from between about 5% to about 10%. This small band width is a disadvantage present in the prior art PIFA-style antennas.

We have discovered that the structure of this invention overcomes these disadvantages and such antennas provide a 400 to 500% increase over the bandwidth available in the prior art. An antenna 20 of the configuration shown in FIGS. 2-4 having the following dimensions was simulated as well as tested:

$L_1$=18 mm
$L_2$=45 mm
$L_3$=14.6 mm
$W_1$=7.2 mm
$W_2$=1.8 mm
$H_1$=4.5 mm
$H_1$=1.8 mm

Figure 5:
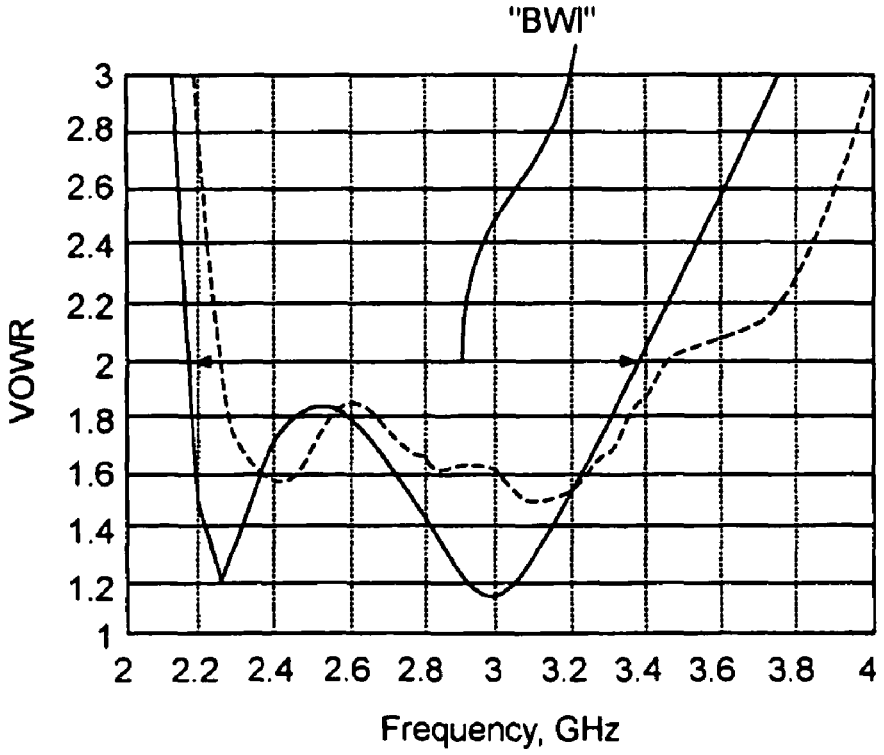
FIG. 5 is a graph illustrating the computed and actual VSWR characteristics of the antenna of FIG. 1.

The results of both the simulation and testing are illustrated in graph of FIG. 5 that displays the VSWR (voltage standing ware ratio) characteristics of the antenna 20. The simulation was run as a function of frequency in a 50 ohm impedance and the results are plotted in FIG. 5 by the dashed line and this simulation has a frequency range of between from about 2200 MHz to about 3400 MHz. When tested, the data for the VSWR substantially agreed to the simulated results and are shown plotted in FIG. 5 as one solid line BW1, identified on the graph. It has been found, with the antennas of the prevent invention, that the ground plate 24, when made small in size, approximately 0.4λ (wavelength) develops completely different characteristics and with a small size, the antennas of the invention permit it to be mounted virtually anywhere on a handset without relying upon a large conducting structure serving as the ground plane, and develops bandwidths of 42 to 49% with a VSWR≦2. The bandwidth is obtained by subtracting the lowest frequency from the highest frequency at the VSWR level of 2 and dividing the center operating frequency, which in turn is obtained by adding the high and low frequencies together and then dividing by 2. This broadband aspect will to reduce the likelihood of adverse effects in the performance of the antenna when mounted on a confirmed area, or when an operator's hand is place over the antenna. In the antenna of the invention, the ground plate is the main radiating element of the antenna structure. It has also been noted that when tested, the current distribution is larger on the ground plate (especially around the longitudinal edges) than the current distribution on the first plate. Thus, the ground plate acts as the primary radiating element of the system.

As for the size of the antennas of the invention, it is commonly known that the "size" of an antenna is measured by the radius of an imaginary sphere that just reduces the antenna and the "size" referred to above is the electrical size which is the principal size relative to a free space wavelength λ and is expressed in units of wavelength. In this regard, the size of the ground plates of the antennas of the invention are small, in the range of 0.4λ, which is greatly different than the large ground plane required for a conventional PIFA-style antenna of the type described in U.S. Pat. No. 5,764,190.

Due to the small dimensions of the antennas of the invention that approximate between about 2 inches to about 2½ inches long, about ⅜ inches wide and about ¼ inches high, it is preferred that the antenna be formed from a single piece of conductive material. However, in some applications it is contemplated that the plates may be assessed together by welding, although it will be understood that the single piece construction is preferable.

Figure 3:
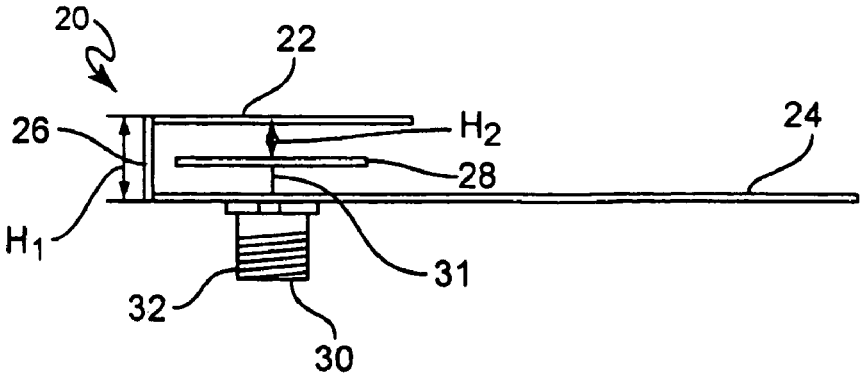
FIG. 3 is a side elevational view of the antenna of FIG. 2.
Figure 4:
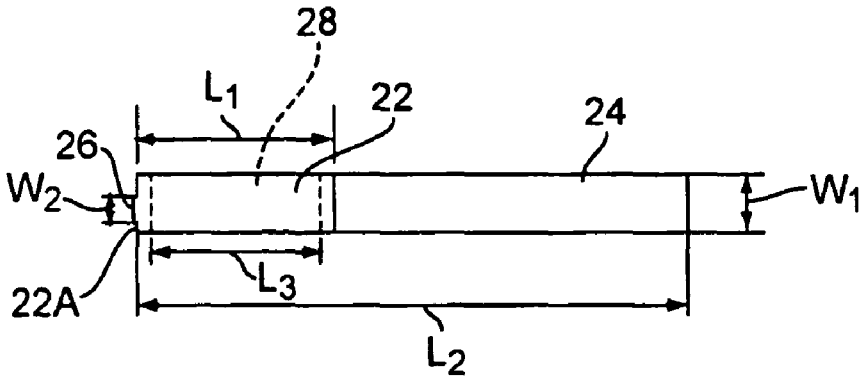
FIG. 4 is a top plan diagrammatic view of the antenna of FIG. 4.

In the antenna of FIGS. 2-4, the feed plate 28 has a length that is about 80% of the length of the first plate 22, and the feed plate 28 is directed so that its second edge (the left edge in FIG. 3) is aligned with and does not project past the corresponding edge of the first plate 22. The width of the shorting plate in this antenna is about 75% of the widths of the first plate and the ground plate.

Figure 6:
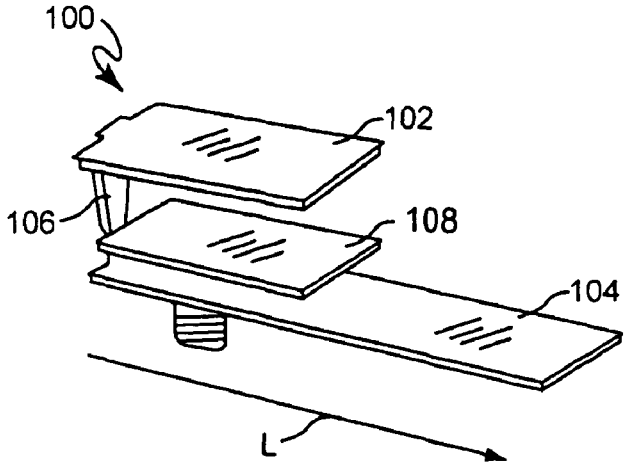
FIG. 6 is a perspective view of a second embodiment of an antenna constructed in accordance with the principles of the present invention.
Figure 7:
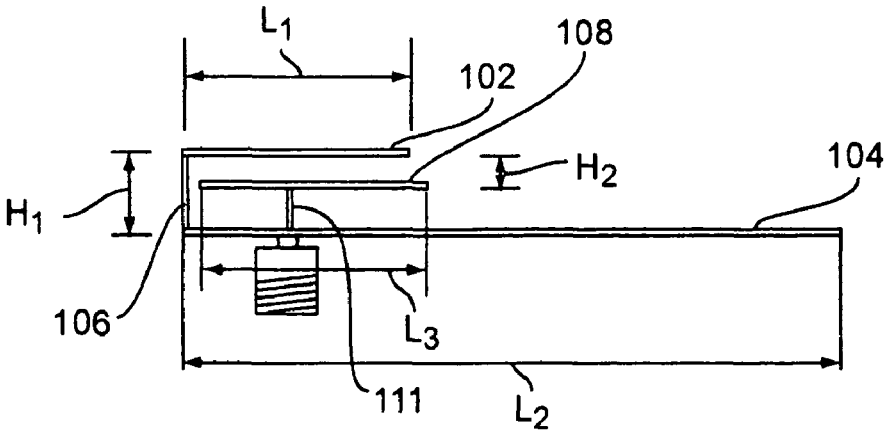
FIG. 7 is a side elevational view of the antenna of FIG. 6.
Figure 8:
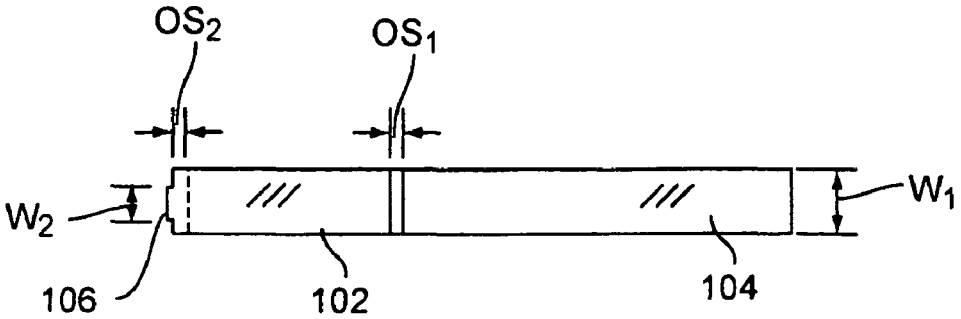
FIG. 8 is a top plan view of the antenna of FIG. 6.

FIG. 6 illustrates another embodiment of an antenna 100 constructed in accordance with the principles of the present invention. The antenna 100 includes a top, or first plate 102, a larger ground plate 104 disposed beneath and spaced apart from the first plate 102, and a shorting plate, or via of small width, 106 that interconnects the two plates 102, 104 together. A feed plate 108 is interposed between the first and the ground plates 102, 104 and is terminated to the inner conductor 111 of a RF connector in a manner similar as done with the antenna 20 of FIGS. 2-4. These three plates 102, 104 and 108 are preferably arranged parallel to each other. In this embodiment, the feed plate 108 is not entirely shielded, or covered, by the first plate 102, but rather is offset by a small distance OS1, as shown in FIGS. 7 & 8. This offset OS1 is about between 5% to about 6% of the length of the first plate 102.

Figure 9:
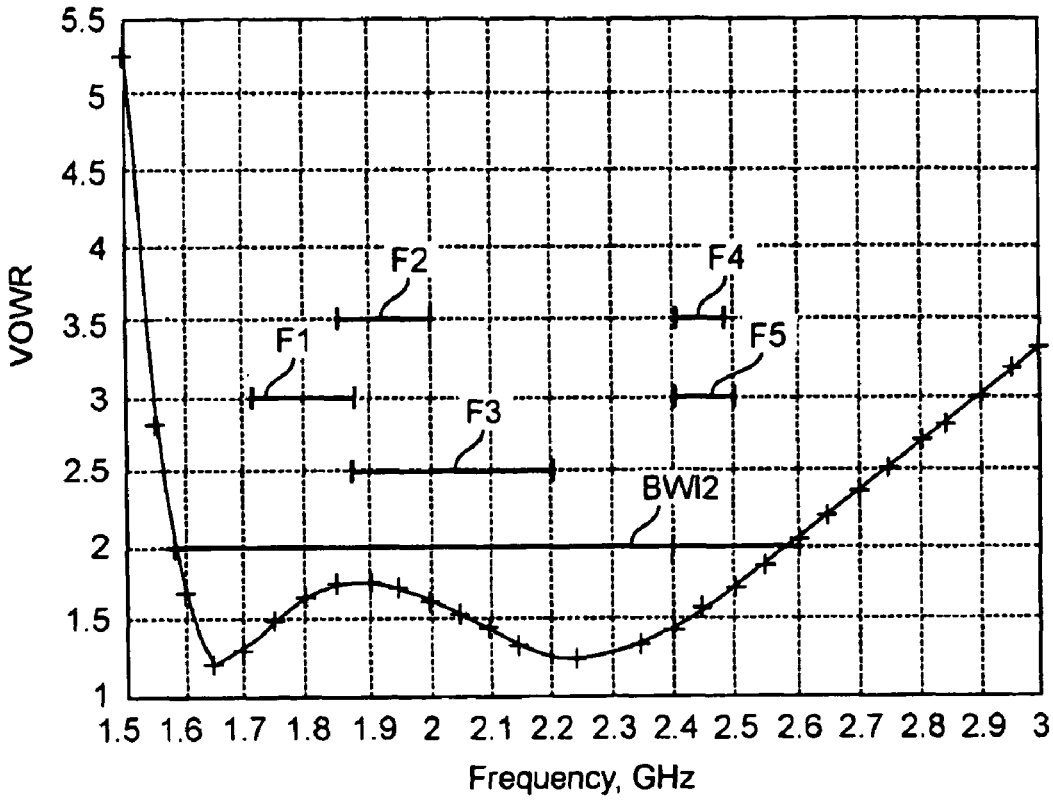
FIG. 9 is a graph illustrating the VSWR characteristics of the antenna of FIG. 6.

This slight offset of the first plate 102 that exposes an edge of the feed plate 108 in combination with the length of the ground plate 104 maintains the desired small size of the antenna 100 and provides an even larger bandwidth than that provided by the first embodiment antenna 20, about 49%, which is about 5 times more than that obtained by the antenna described in U.S. Pat. No. 5,764,190. FIG. 9 is a graph showing the beneficial and unexpected result obtained from the second antenna embodiment, and shows the VSWR characteristics of the antenna 100 over a wide frequency range for a 50 ohm impedance match and a VSWR value of 2 or less. The bandwidth is indicated by bold line BW2 and it can be seen to extend from about 1.58 GHz to about 2.6 GHz for bandwidth of approximately 1015 MHz. The antenna 100 was constructed with the following dimensions:

$L_1$=28.7 mm
$L_2$=62.0 mm
$L_3$=24.7 mm
$W_1$=10.0 mm
$W_2$=3.2 mm
$H_1$=6.0 mm 031=
$H_2$=2.8 mm 032=

In this antenna embodiment 100, the first plate length $L_1$ has about 46% of the length of the ground plate length, $L_2$, while in the first antenna embodiment 20, the first plate length $L_1$ has about 40% of the length of the ground plate length $L_2$. While all the operating bases for the present invention are not yet known, it is believed that the first plate should have a length that is between about 38% to 50% that of the ground plate length. Similarly, the length of the feed plate 108 is about 86% of the length of the first plate 102 and the feed plate 108 should have a length that is between about 80% to about 90% of the length of the first plate 102. The width of the shorting plate in this antenna is about 32% of the width of the first and ground plates. It is believed that the width of the shorting plate affects the operation of the invention and that the shorting plate should be between about 20% to about 40% of the widths of the first and ground plates.

It will be understood that the antennas of the invention offer significant improvement in performance over those in use of the prior art. The wide bandwidth of the antennas of the invention is important not only because their reduced size permits them to be inserted into palm-sized devices, but also permits the devices on which the antennas are used to be operational in different wireless systems using only a single feed. For example, the DCS-1800 wireless system uses a frequency band of 1710-1880 MHz, the PCS-1900 communications system uses a frequency band of 1850-1990 MHz, the IMT-2000 uses a frequency band of 1888-2200 MHz, the ISM (and including WLAN) uses a frequency band of 2400-2483 MHz, while the promising Bluetooth system uses the frequency band of 2400-2500 MHz. These five frequency bands are illustrated on FIG. 9, with the smaller bold lines and respectively indicated as F1 through F5. As can be seen, the bandwidth of 1015 MHz indicated encompasses all of these frequency bands.

Additionally, the polarization of the antennas of the invention occur*s* along these lengths shown as L in FIGS. 2 and 6 with the [onmi-directional] *omni-directional* radiating pattern in the plane perpendicular to the antenna[.] (the azimuth plane). The antennas of the present invention also have [this] *these* omni-directional characteristics throughout the entire frequency band. This makes the antennas of the invention desirable to embed in portable wireless devices ranging from laptop computers to [hand held] *hand-held* devices such as PDA's (personal digital assistants) to wireless telephones.

While the preferred embodiment of the invention have been shown and described, it will be apparent to those skilled in the art that changes and modifications may be made therein without departing from the spirit of the invention, the scope of which is defined by the appended claims.

What is claimed is:

1. A low profile broad band antenna, comprising a first conductive plate having a first length and first width, the first conductive plate having opposite first and second ends;

a second conductive plate having a second length that is greater than said first conductive plate first length and a second width that does not exceed the first conductive plate first width, the second conductive plate also having opposite first and second ends;

the first ends of said first and second conductive plates being aligned with each other;

a shorting plate interconnecting said first and second conductive plates together the shorting plate having a width that is less than said first and second conductive plate widths, the shorting plate extending in a plane transverse to said first and second conductive plates alongside said first ends of said first and second conductive plates;

a feed plate having a predetermined length and width and interposed between said first and second conductive plates, the feed plate having opposed first and second edges, said feed plate width being equal to the widths of said first and second conductive plates, said feed plate being disposed such that said first edge is spaced apart from said shorting plate and said second conductive plate, and said first plate second edge being aligned with said feed plate second edge so as not to exceed said feed plate second edge;

a feed connector to said antenna, a center conductor of said antenna, a center conductor of said feed connector extending through said second plate and terminated in said feed plate and a ground conductor of said feed connector being terminated to said second plate.

2. The antenna as set forth in claim 1, wherein said first, second and shorting plates are integrally formed from a single piece of conductive material.

3. The antenna as set forth in claim 1, wherein said second edge of said first plate is offset from said second edge of said feed plate so as to expose a portion of said feed plate.

4. The antenna as set forth in claim 3, wherein said first plate second edge is offset about 5 to 6% of its length.

5. The antenna as set forth in claim 1, hence said first plate length is between about 40% to 50% of said second plate length.

6. The antenna [is] *as* set forth in claim 1, wherein said feed plate capacitively feeds said first plate when said antenna is energized.

7. The antenna as set forth in claim 1, wherein said first and feed plate second edges are aligned with each other such that an imaginary line interconnecting them is perpendicular to said first and feed plates.

8. The antenna as set forth in claim 1, wherein said second plate is a radiating element of said antenna when said antenna is energized and wherein said bandwidth of said antenna ranges from about 40% to about 59%.

9. The antenna as claimed in claim 1, wherein said shorting plate has a width that is between about 20% to about 40% of said widths of said first and second plates.

10. The antenna as claimed in claim 1, wherein said antenna is polarized along its length when energized.

11. The antenna as claimed in claim 1, wherein said feed plate has a length that is between about 80% to about 90% of the length of said first conductive plate.

12. The antenna as claimed in claim 1, wherein said second edges of said first conductive plate and said feed plate are vertically aligned with each other so that said first conductive plate covers all of said feed plate.

13. The antenna as claimed in claim 1, wherein said second [edges] *edge* of said first conductive plate is offset with respect to said second edge of said feed plate so that a portion of said feed plate is viewable looking from above said first conductive plate.

*14. A system comprising:*

*a wireless device; and*

*a low profile broad band antenna coupled to the wireless device, the antenna comprising a first conductive plate having a first length and first width, the first conductive plate having opposite first and second ends; a second conductive plate having a second length that is greater than said first conductive plate first length and a second width that does not exceed the first conductive plate first width, the second conductive plate also having opposite first and second ends; the first ends of said first and second conductive plates being aligned with each other; a shorting plate interconnecting said first and second conductive plates together the shorting plate having a width that is less than said first and second conductive plate widths, the shorting plate extending in a plane transverse to said first and second conductive plates alongside said first ends of said first and second conductive plates; a feed plate having a predetermined length and width and interposed between said first and second conductive plates, the feed plate having opposed first and second edges, said feed plate width being equal to the widths of said first and second conductive plates, said feed plate being disposed such that said first edge is spaced apart from said shorting plate and said second conductive plate, and said first plate second edge being aligned with said feed plate second edge so as not to exceed said feed plate second edge; a feed connector to said antenna, a center conductor of said antenna, a center conductor of said feed connector extending through said second plate and terminated in said feed plate and a ground conductor of said feed connector being terminated to said second plate.*

*15. The system as set forth in claim 14, wherein said first, second and shorting plates are integrally formed from a single piece of conductive material.*

*16. The system as set forth in claim 14, wherein said second edge of said first plate is offset from said second edge of said feed plate so as to expose a portion of said feed plate.*

*17. The system as set forth in claim 16, wherein said first plate second edge is offset about 5 to 6% of its length.*

*18. The system as set forth in claim 14, hence said first plate length is between about 40% to 50% of said second plate length.*

*19. The system as set forth in claim 14, wherein said feed plate capacitively feeds said first plate when said antenna is energized.*

*20. The system as set forth in claim 14, wherein said first and feed plate second edges are aligned with each other such that an imaginary line interconnecting them is perpendicular to said first and feed plates.*

*21. The system as set forth in claim 14, wherein said second plate is a radiating element of said antenna when said antenna is energized and wherein said bandwidth of said antenna ranges from about 40% to about 59%.*

*22. The system as claimed in claim 14, wherein said shorting plate has a width that is between about 20% to about 40% of said widths of said first and second plates.*

*23. The system as claimed in claim 14, wherein said antenna is polarized along its length when energized.*

*24. The system as claimed in claim 14, wherein said feed plate has a length that is between about 80% to about 90% of the length of said first conductive plate.*

*25. The system as claimed in claim 14, wherein said second edges of said first conductive plate and said feed plate are vertically aligned with each other so that said first conductive plate covers all of said feed plate.*

*26. The system as claimed in claim 14, wherein said second edges of said first conductive plate is offset with respect to said second edge of said feed plate so that a portion of said feed plate is viewable looking from above said first conductive plate.*

* * * * *

UNITED STATES PATENT AND TRADEMARK OFFICE

CERTIFICATE OF CORRECTION

PATENT NO. : RE42,672 E
APPLICATION NO. : 11/516804
DATED : September 6, 2011
INVENTOR(S) : Stutzman et al.

It is certified that error appears in the above-identified patent and that said Letters Patent is hereby corrected as shown below:

Column 1, line 10, below "reissue." insert
-- CROSS-REFERENCE TO RELATED APPLICATIONS --.

Signed and Sealed this
Thirteenth Day of March, 2012

David J. Kappos

David J. Kappos
*Director of the United States Patent and Trademark Office*